(12) United States Patent
Kuil et al.

(10) Patent No.: US 6,245,375 B1
(45) Date of Patent: Jun. 12, 2001

(54) DRESSING

(75) Inventors: Gijsbertus Kuil, Vlaardingen; Yadi Heydari, Rotterdam; Barbara M C Pelan, Vlaardingen; Bert Schenk, Rotterdam, all of (NL)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/291,336

(22) Filed: Apr. 14, 1999

(30) Foreign Application Priority Data

Apr. 24, 1998 (EP) .................................................. 98201342

(51) Int. Cl.⁷ ....................................................... A23L 1/05
(52) U.S. Cl. .......................... 426/573; 426/575; 426/602; 426/605; 426/106
(58) Field of Search .................................. 426/605, 575, 426/573, 106, 602

(56) References Cited

U.S. PATENT DOCUMENTS

| 4,578,278 | * | 3/1986 | Giddey | 426/605 |
| 4,943,445 | * | 7/1990 | Norton | 426/573 |
| 5,002,934 | * | 3/1991 | Norton | 514/54 |
| 5,104,679 | | 4/1992 | Jurcso . | |
| 5,114,733 | * | 5/1992 | Quinet | 426/605 |
| 5,626,901 | * | 5/1997 | Pedersen | 426/589 |
| 5,641,533 | * | 6/1997 | Ambjerg Pedersen | 426/605 |
| 5,773,072 | * | 6/1998 | Campbell | 426/605 |
| 5,804,238 | * | 9/1998 | Tanaka | 426/604 |
| 5,817,363 | * | 10/1998 | Bakker | 426/602 |
| 5,837,308 | * | 11/1998 | Campbell | 426/602 |
| 5,897,905 | * | 4/1999 | Bialek | 426/602 |
| 5,922,391 | * | 7/1999 | Trueck | 426/605 |
| 5,958,498 | * | 9/1999 | Trueck | 426/605 |
| 5,976,587 | * | 11/1999 | Yamauchi | 426/601 |

FOREIGN PATENT DOCUMENTS

| 2172313 | 10/1996 | (CA) . |
| 0 738 472 | 4/1995 | (DE) . |
| 2 248 023 | 5/1975 | (FR) . |
| 1486634 | 9/1977 | (GB) . |
| 2 143 114 | 2/1985 | (GB) . |
| 2143114 | 2/1985 | (GB) . |
| 0 271 132 | 11/1987 | (GB) . |
| 0 355 908 | 2/1990 | (NL) . |
| WO 96/02151 | 2/1996 | (WO) . |

OTHER PUBLICATIONS

XP–002114487; Layered Dressing Containing Dextrin Alcohol to Produce Clear Boundary Oil Water Layer; Database WPI, Section Ch, Week 7837, Derwent Publications Ltd., London, GB; Class A97, AN78–66371A; Aug. 17, 1998; Abstract JP53028981B.

* cited by examiner

Primary Examiner—Carolyn Paden
(74) Attorney, Agent, or Firm—James J. Farrell

(57) ABSTRACT

The invention relates to a translucent dressing which can be manufactured and offered to the consumer as a two-phase system, having separate oil and water layers. Upon shaking by hand, an emulsion is produced which remains stable for at least one week. Such a dressing is suitable for use on e.g. salad.

10 Claims, 1 Drawing Sheet

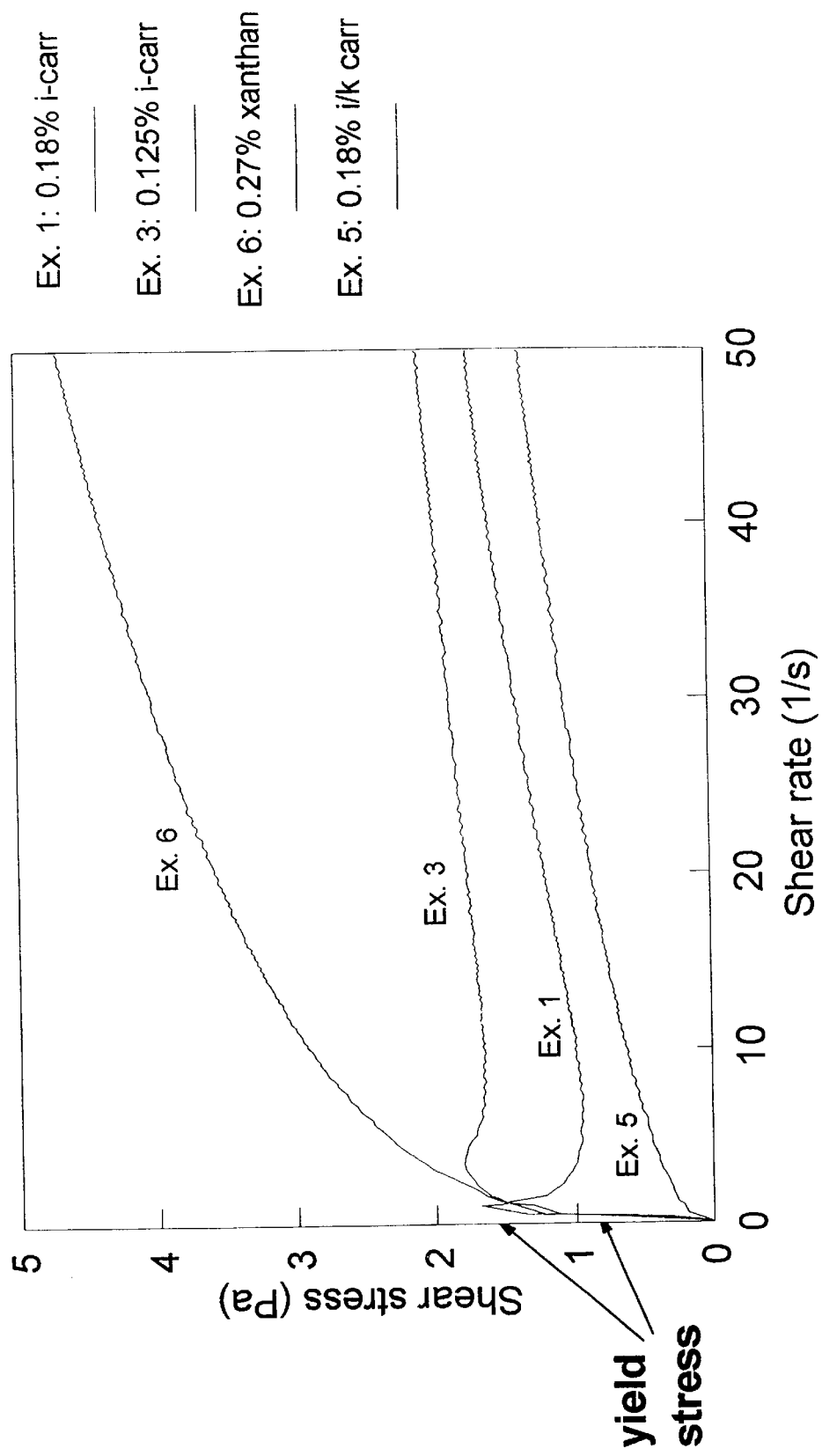
Figure 1: Shear stress vs shear rate
Aqueous phase measured without oil

DRESSING

FIELD OF THE INVENTION

The present invention relates to a translucent dressing which can be manufactured and offered to the consumer as a two-phase system. Upon shaking by hand, an emulsion is produced which remains stable for at least one week. Such a dressing is suitable for use on e.g. salad.

BACKGROUND OF THE INVENTION

Conventional dressings for use on salads, especially those in use in Mediterranean countries, are emulsions of an oil phase (e.g. 50–60%) in a water phase (containing vinegar), optionally further containing salt, herbs, and spices. As the size of the oil droplets in these dressings is around 0.2–5 mm it is easily visible by the eye that oil is present. Such dressings are conventionally prepared fresh by the housewife by shaking or stirring oil (40–70%), vinegar (60–30%) and optionally salt, herbs together, to give a translucent, emulsified but not very stable salad dressing. Such dressing will generally be used directly after mixing and before phase separation occurs. Similar formulations are also commercially available but give rise to phase separation and/or the formation of creamy, turbid layers.

As a convenient alternative, there are available ready-to-use salad dressings which are in the form of a stable fine emulsions of oil and water, having an opaque, milky appearance, with no oil visibly present (either as droplets or as a separate layer).

Yet other type emulsions (having more coarse oil droplets) are disclosed in GB 2 143 114. Herein, salad dressings containing 10–50% oil, 0.1–0.4% gum arabicum, 0.3–0.7% iota-carrageenan and water are described. Said composition is processed to form an emulsion using emulsifying apparatus. It is reported the so-prepared emulsion is stable for at least several months. In order for such emulsions to be stable, either high levels of emulsifiers and stabilisers need to be used or the amount of oil which can be emulsified in the water in a stable manner is restricted, e.g. to 50% or less. If low levels of emulsifiers or stabilisers are used or high levels of oil, phase separation is likely to occur. Although such dressings may be convenient in use, they are generally perceived by the customer as artificial, as no oil can readily be seen as a separate layer (the visible presence of oil is seen as a quality attribute in dressings).

SUMMARY OF THE INVENTION

Up till now, dressings suitable for application on salad either are stable emulsions that have no visible oil present, have a limited amount of oil, or are compositions that are not stable for more than a few minutes after applying shear or have a tendency to separate in creamy, turbid layers.

Although the stable emulsions as disclosed in GB 2 143 114 (which appears as a single phase system in which oil is not visible as a separate layer) are attractive to consumers in many countries, consumers in other countries (e.g. Spain) have a preference for salad dressings which are both easy to use (e.g. single pack purchase, easy to convert in an emulsion of reasonable stability) and which have, at least upon purchase, visibly present oil and water phases, preferably as separate layers. Such products would be seen as high quality, "artisanal" type products, resembling in appearance traditional home-made products (the visible oil layer which is initially present). After conversion into an emulsion, the droplet size of the oil droplets should preferably such that a majority of them can be seen by the eye.

Hence, there is a need for packed composition containing all ingredients needed for preparing a high quality dressing suitable for application on salad, which packed composition preferably appears as a two-phase system on purchase by the customer (an oil phase being visible by the eye, preferably as separate layers), but which composition may be transformed into a dressing by shaking the packed composition by hand by the customer prior to use. Preferably, the composition should be such that high levels of oil 50–70% (preferably 50–65%) are present.

It is preferred that a once formed emulsion is stable for at least a few hours, preferably days to weeks. Also, it is preferred that if chopped vegetables or herbs (particle size e.g. 0.5–5 mm) are present in the composition they neither settle at the bottom nor be floating on the water or oil layer.

It has now been found that the above objectives can be achieved by a container in which is present a composition comprising (based on the total composition):
a vegetable oil phase in an amount of 30–70 wt %
a water phase in an amount of 70–30 wt %,
a thickener capable of giving a yield stress when dissolved in water,
wherein at least the majority of the oil is present as a separate, visible and transparent layer and wherein the amount of thickener is such that composition gives upon shaking by hand an oil-in-water emulsion which is stable for at least one week.

To prepare the above composition the thickener is dissolved in the water phase (or a part thereof), whereafter all components are introduced in the container. In the absence of agitation or emulsifying action, a two-layer system will form, which can be distributed and sold as such, and which may be turned in a dressing by the end user by shaking the container by hand, thus closely resembling (both in appearance and processing by the consumer) traditional, home-made clear salad dressings.

BRIEF DESCRIPTION OF THE DRAWINGS

FIG. 1 shows stress shear as a function of shear rate for the water phases of examples 1, 3, 5 and 6.

DETAILED DESCRIPTION OF THE INVENTION

In the compositions according to the invention it is preferred (in order to achieve the desired stability) that the water phase comprising the thickener has a yield stress of at least 0.3 Pa. Preferably, the yield stress is larger than 0.5 Pa, more preferably larger than 0.7 Pa. Although the yield stress may be quite large, it should not be too large, as it will then cause difficulties to mix the oil phase with the water phase by hand force. Hence, the water phase in the composition preferably has a yield stress of less than 5 Pa, more preferably less than 2.5 Pa.

With the system as presented herein it is possible to offer compositions which contain all ingredients desired for a dressing for e.g. salads, which compositions may contain high levels of oil (e.g. 50–65% or even 50–70%, based on the total composition) and which compositions can still be stable for a period of at least a week.

A suitable thickener for obtaining the desired stability or yield stress according to the above is iota-carrageenan. Hence, the water phase should preferably containing such an amount of carrageenan that the yield stress is larger than 0.3 Pa (or preferably larger than 0.5 Pa, more preferably larger than 0.7 Pa). It was found that if iota-carrageenan is present in an amount of 0.2 or more and less than 0.65% by weight, based on the water phase, the desired stability could be obtained, depending upon e.g. the amount of oil and solids present, without the water phase becoming too viscous (too viscous in this respect is such that the dressing is no longer easy pourable). More preferably, the amount of iota-carrageenan present in the water phase is between 0.3 and 0.55% (or even 0.3–0.45%) by weight, based on the water phase.

The yield stress can be determined from a graph of shear stress vs shear rate. The above values of yield stress of the water phase relate to measurements when the shear stress as a function of the shear rate is measured using a Carrimed CSL 500 rheometer using a 6 cm 2 deg. cone, at a temperature of 20° C. Shear rate is to be increased from 0 to 50 (1/s) in 300 seconds, and the shear stress can be measured. From a graph of the shear stress (Pa) vs. shear rate (1/s) the yield stress can be found by extrapolating the curve to shear rate=0.

As the composition in the container according to the invention is intended to be used as a salad dressing (which is traditionally acidic), it is preferred that the water phase comprises an organic acid in such an amount that the pH of the water phase is between 2.0 and 4.5, preferably between 2.5 and 4.0. Such an organic acid can suitably be chosen from acetic acid (e.g. from vinegar), citric acid, lactic acid or mixtures thereof.

To impart a specific flavour to the salad to which the dressing herein disclosed is applied it may be preferred that the composition in the container further comprises salt, herbs, spices, chopped garlic, garlic oil, or mixtures thereof, in an amount of 0.1–10 wt % based on the total mixture. Other ingredients like chopped vegetables or olives may also be added. Preferably the above particulate material is dispersed in the water phase in a stable manner.

The amount of oil present in the composition in the container according to the invention may vary between 30–70 wt % based on the total composition, although minimum amounts of 40 wt % and maximum amounts of 65 wt % may be preferred as this are the amounts traditionally used in salad dressings.

The compositions as disclosed above are preferably packed in containers having a single space, such as ordinary flasks, bottles, jars, cans, etcetera. In order to make the particular properties of the present invention visible, such container is preferably at least partially transparent or translucent. Glass bottles are preferred in this respect.

The compositions as described above can suitably be prepared by first preparing a water phase containing all ingredients except for the oil. Such a water phase then contains the suitable thickener, the organic acid such as acetic acid, and optionally salts, herbs and spices. The water phase is preferably heated (e.g. to temperatures of 75–95° C.) for pasteurising purposes and/or for ensuring the thickener is adequately dissolved. After cooling (e.g. to below 30° C.), the water phase can be poured in the container the composition is ultimately sold (e.g. glass or plastic bottle). Thereafter the oil phase (generally only containing vegetable oil such as sunflower or olive oil) can be added by gently pouring it (e.g. via the wall of the bottle) on top of the water phase layer and closing the bottle. A suitable amount of headspace should be allowed to ensure mixing is possible by shaking the container by hand.

The invention is further exemplified by the following examples, which are to be understood as to be non-limiting.

EXAMPLE 1

A dressing composition having an oil content of 50% was prepared having the following composition:

| ingredient | total % | % on water phase |
|---|---|---|
| sunflower oil | 50.0 | |
| salt | 2.0 | 4.0 |
| vinegar (10%) | 8.0 | 16.0 |
| iota-carrageenan* | 0.18 | 0.36 |
| water | 39.82 | 79.64 |
| total | 100 | |

*iota-carrageenan used was Deltagel 552, ex Quest International, the Netherlands.

Preparation: all ingredients except for the oil were mixed to form the water phase, said waterphase was heated under stirring to 90° C. Thereafter, under continuous stirring the waterphase was cooled to 30° C. Glass bottles (250 ml) were filled with 115 ml of the water phase and gently, 115 ml of the oil was poured gently on the water phase.

The appearance was a clear/translucent water phase with on top of that a clear oil phase. Upon shaking, a coarse emulsion is obtained which remained stable for at least 6 weeks. ("stable" is herein to be understood as no oil or water separation and no formation of creamy, turbid layers between the oil and water phase.)

Of the water phase, the shear stress as a function of the shear rate was measured using a Carrimed CSL 500 rheometer using a 6 cm 2 deg. cone, at a temperature of 20° C. Shear rate was increased from 0 to 50 (1/s) in 300 seconds, and the shear stress was measured. From a graph of the shear stress (Pa) vs. shear rate (1/s) the yield stress was found by extrapolating the curve to shear rate=0.

EXAMPLE 2

A dressing composition having an oil content of 60% was prepared having the following composition:

| ingredient | total % | % on water phase |
|---|---|---|
| sunflower oil | 60.0 | |
| salt | 2.0 | 5.0 |
| vinegar (10%) | 8.0 | 20.0 |
| iota-carrageenan* | 0.20 | 0.50 |
| onion pieces | 0.10 | 0.25 |
| carrot pieces | 0.10 | 0.25 |
| water | 29.6 | 74 |
| total | 100 | |

*iota-carrageenan used was Deltagel 552, ex Quest International, the Netherlands.

Preparation: all ingredients except for the oil were mixed to form the water phase, said waterphase was heated under stirring to 90° C. Thereafter, under continuous stirring the waterphase was cooled to 30° C. Glass bottles (250ml) were filled with 92 ml of the water phase and gently, 138 ml of the oil was poured gently on the water phase.

The appearance was a clear/translucent water phase with the onion and carrot particles evenly distributed, and on top of the water layer a clear oil phase. Upon shaking, a coarse emulsion is obtained which remained stable for at least 6 weeks. ("stable" is herein to be understood as no oil or water separation and no formation of creamy, turbid layers between the oil and water phase.) The onion and carrot particles remained evenly distributed over the whole composition.

EXAMPLE 3

A dressing composition having an oil content of 70% was prepared having the following composition:

| ingredient | total % | % on water phase |
|---|---|---|
| sunflower oil | 70.0 | |
| salt | 1.50 | 5.0 |
| white wine vinegar (10%) | 6.0 | 20.0 |
| garlic pieces | 0.20 | 0.67 |
| iota-carrageenan* | 0.125 | 0.42 |
| water | 22.18 | 73.92 |
| total | 100 | |

*iota-carrageenan used was Deltagel 552, ex Quest International, the Netherlands.

Preparation: all ingredients except for the oil were mixed to form the water phase, said waterphase was heated under stirring to 90° C. Thereafter, under continuous stirring the waterphase was cooled to 30° C. Glass bottles (250 ml) were filled with 66 ml of the water phase and gently, 154 ml of the oil was poured gently on the water phase.

The appearance was a clear/translucent water phase with on top of that a clear oil phase. Upon shaking, a coarse emulsion is obtained which remained stable for at least 6 weeks. ("stable" is herein to be understood as no unacceptable oil or water separation and no formation of creamy, turbid layers between the oil and water phase.)

EXAMPLE 4

(Control)

A dressing composition having an oil content of 50% was prepared having the following composition:

| ingredient | total % | % on water phase |
|---|---|---|
| sunflower oil | 50.0 | |
| salt | 1.50 | 3.0 |
| alcohol vinegar (10%) | 6.0 | 12.0 |
| dried parsley | 0.05 | 0.10 |
| xanthan-gum* | 0.35 | 0.70 |
| water | 42.10 | 84.20 |
| total | 100 | |

*xanthan-gum used was Keltrol F, ex Kelco.

Preparation: all ingredients except for the oil were mixed to form the water phase, said waterphase was heated under stirring to 75° C. Thereafter, under continuous stirring the waterphase was cooled to 30° C. Glass bottles (250 ml) were filled with 110 ml of the water phase and gently, 110 ml of the oil was poured gently on the water phase.

The appearance was a clear/translucent water phase with on top of that a clear oil phase. Upon shaking, a coarse emulsion is obtained which did not remain stable. Within less than 6 weeks a visible oil layer at the top and a visible water layer at the bottom formed. Also, the parsley was not distributed evenly over the composition, but aggregated in the middle part of the composition.

EXAMPLE 5

(Control)

A dressing composition having an oil content of 50% was prepared having the following composition:

| ingredient | total % | % on water phase |
|---|---|---|
| sunflower oil | 50.0 | |
| salt | 2.0 | 4.0 |
| vinegar (10%) | 8.0 | 16.0 |
| iota/kappa-carrageenan mixture* | 0.18 | 0.36 |
| water | 39.82 | 79.64 |
| total | 100 | |

*iota/kappa-carrageenan mixture used was Hamulsion DBV, ex Hahn & Co, the Netherlands.

Preparation: all ingredients except for the oil were mixed to form the water phase, said waterphase was heated under stirring to 90° C. Thereafter, under continuous stirring the waterphase was cooled to 30° C. Glass bottles (250ml) were filled with 110 ml of the water phase and gently, 110 ml of the oil was poured gently on the water phase.

The appearance was a clear/translucent water phase with on top of that a clear oil phase. Upon shaking, a coarse emulsion is obtained which did not remain stable. Within less than 6 weeks a visible oil layer at the top and a visible water layer at the bottom formed.

EXAMPLE 6

(Control)

A dressing composition having an oil content of 50% was prepared having the following composition:

| ingredient | total % | % on water phase |
|---|---|---|
| sunflower oil | 50.0 | |
| salt | 1.50 | 3.0 |
| alcohol vinegar (10%) | 6.0 | 12.0 |
| dried parsley | 0.05 | 0.10 |
| xanthan-gum* | 0.27 | 0.54 |
| water | 42.18 | 84.36 |
| total | 100 | |

*xanthan-gum used was Keltrol F, ex Kelco.

Preparation: all ingredients except for the oil were mixed to form the water phase, said waterphase was heated under stirring to 75° C. Thereafter, under continuous stirring the waterphase was cooled to 30° C. Glass bottles (250ml) were filled with 110 ml of the water phase and gently, 110 ml of the oil was poured gently on the water phase.

The appearance was a clear/translucent water phase with on top of that a clear oil phase. Upon shaking, a coarse emulsion is obtained which did not remain stable. Within less than 6 weeks a visible oil layer at the top and a visible water layer at the bottom formed. Also, the parsley was not distributed evenly over the composition, but aggregated in the middle part of the composition.

Yield Stress

Shear stress as a function of the shear rate was measured for the water phases of examples 1, 3, 5, and 6. This was done using a Carrimed CSL 500 rheometer using a 6 cm 2 deg. cone, at a temperature of 20° C. Shear rate is to be increased from 0 to 50 (1/s) in 300 seconds, and the shear stress was measured. From a graph of the shear stress (Pa) vs. shear rate (1/s) the yield stress was found by extrapolating the curve to shear rate=0. The results are set out in FIG. 1. Examples 1 and 3 showed a yield stress of approx. 0.8 and 1.6 Pa, respectively. Examples 5 and 6 showed little to no yield stress.

What is claimed is:

1. A container in which is present a composition comprising (based on the total composition):
   a vegetable oil phase in an amount of 30–70 wt %
   a water phase in an amount of 70–30 wt %
   a thickener capable of giving a yield stress when dissolved in water, wherein at least the majority of the oil is present as a separate, visible and transparent layer and wherein the amount of the thickener is such that the composition gives upon shaking by hand an oil-in-water emulsion which is stable for at least one week, wherein the water phase comprising the thickener has a yield stress of at least 0.3 Pa and less than 5 Pa.

2. Container according to claim 2, wherein the water phase comprising the thickener has a yield stress of at least 0.5 Pa.

3. Container according to claim 1, wherein the amount of oil is more than 50% by weight and less than 65% by weight.

4. Container according to claim 1, wherein the water phase contains iota-carrageenan in an amount of at least 0.2 and less than 0.65% by weight, based on the water phase.

5. Container according to claim 4, wherein the water phase contains iota-carrageenan in an amount of between 0.3 and 0.55% by weight, based on the water phase.

6. Container according to claim 1, wherein the water phase comprises an organic acid in such an amount that the pH of the water phase is between 2.0 and 4.5.

7. Container according to claim 6, characterised in that the organic acid comprises acetic acid, citric acid, lactic acid or mixtures thereof.

8. Container according to claim 1, characterised in that it further contains salt and or particulate material selected from herbs, spices, chopped garlic, garlic oil, or mixtures thereof, in an amount of 0.1–10 wt % based on the total mixture.

9. Container according to claim 8, characterised in that the particulate material is dispersed in the water phase in a stable manner.

10. Container according to claim 1, characterised in that the container is a transparent or translucent bottle, flask, or jar.

* * * * *